United States Patent [19]
Singh et al.

[11] Patent Number: 6,055,539
[45] Date of Patent: Apr. 25, 2000

[54] METHOD TO REDUCE I/O FOR HIERARCHICAL DATA PARTITIONING METHODS

[75] Inventors: Vineet Singh, San Jose, Calif.; Anurag Srivastava, Minneapolis, Minn.

[73] Assignee: International Business Machines Corporation, Armonk, N.Y.

[21] Appl. No.: 08/884,080

[22] Filed: Jun. 27, 1997

[51] Int. Cl.[7] .................................................. G06F 17/30
[52] U.S. Cl. .......................................... 707/102; 707/100
[58] Field of Search .................... 707/1, 5, 10, 100–104, 707/200–206; 395/800.25, 821; 364/228.7, 222.81, 937.1

[56] References Cited

U.S. PATENT DOCUMENTS

| | | | |
|---|---|---|---|
| 5,787,274 | 7/1998 | Agrawal et al. | 707/102 |
| 5,799,300 | 8/1998 | Agrawal et al. | 707/5 |
| 5,799,311 | 8/1998 | Agrawal et al. | 707/102 |

OTHER PUBLICATIONS

John Shafer et al., "SPRINT: A Scalable Parallel Classifier for Data Mining", Proceedings of the 22nd VLDB Conference, Mumbai (Bombay), India, (1996). pp. 544–555.
R. Agrawal et al., "An Interval Classifier for Database Mining Applications", Proceedings of the 18th VLDB Conference, Vancouver, British Columbia, (1992), pp. 560–573 and cover page.
R. Agrawal et al., "Database Mining: A Performance Perspective", IEEE Transactions on Knowledge and Data Engineering, vol. 5, No. 6, Dec. 1993, pp. 914–925.
L. Breiman et al., "Classification and Regression Trees", Wadsworth & Brooks/Cole Advanced Books & Software, Monterey, California, 1984 pp. 18–59.
M. Mehta et al., "MDL–based Decision Tree Pruning", Proceedings First International Conference on Knowledge Discovery & Data Mining, D (KDD–95), Aug. 1995, pp. 216–221.
J. R. Quinlan et al., "Inferring Decision Trees Using the Minimum Description Length Principle", Information and Computation, vol. 80, (1989), pp. 227–248.
M. Mehta et al., "SLIQ: Fast scalable Classifier for Data Mining", EDBT 96, Avignon, France, Mar. 1996, pp. 18–33.
D. J. DeWitt et al., "Parallel Sorting on Shared–Nothing Architecture using Probabilistic Splitting", IEEE International First Conference on Parallel and Distributed Informaton Systems, Dec. 4–6, 1991, Miami Beach, Florida, pp. 280–291 & cover sheet.
Mike James, "Classification Algorithms", (book), Wiley–Interscience Publicaton, (1985), Chapters 1–3.
J. Catlett, "Megainduction: Machine Learning on Very Large Databases", PHD Thesis, University of Sidney, issue Jun./Dec. 1991.

*Primary Examiner*—Ruay Lian Ho
*Attorney, Agent, or Firm*—Kevin M. Jordan

[57] ABSTRACT

A method and system for generating a decision-tree classifier from a training set of records, independent of the system memory size. The method includes the steps of: generating an attribute list for each attribute of the records, sorting the attribute lists for numeric attributes, and generating a decision tree by repeatedly partitioning the records using the attribute lists. For each node, split points are evaluated to determine the best split test for partitioning the records at the node. Preferably, a gini index and class histograms are used in determining the best splits. The gini index indicates how well a split point separates the records while the class histograms reflect the class distribution of the records at the node. Also, a hash table is built as the attribute list of the split attribute is divided among the child nodes, which is then used for splitting the remaining attribute lists of the node. The method reduces I/O read time by combining the read for partitioning the records at a node with the read required for determining the best split test for the child nodes. Further, it requires writes of the records only at one out of n levels of the decision tree where $n \geq 2$. Finally, a novel data layout on disk minimizes disk seek time. The I/O optimizations work in a general environment for hierarchical data partitioning. They also work in a multi-processor environment. After the generation of the decision tree, any prior art pruning methods may be used for pruning the tree.

22 Claims, 14 Drawing Sheets

| Age | Car Type | Risk |
|---|---|---|
| 23 | family | High |
| 17 | sports | High |
| 43 | sports | High |
| 68 | family | Low |
| 32 | truck | Low |
| 20 | family | High |
Fig. 1
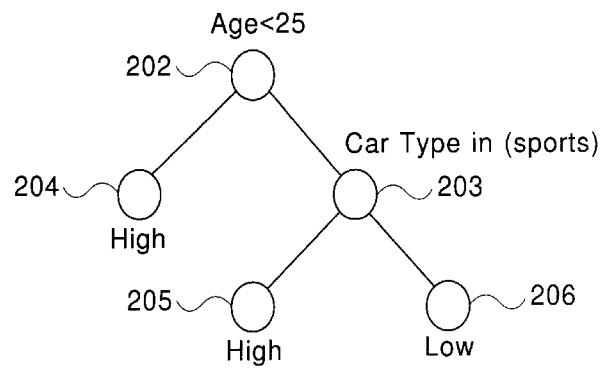
Fig. 2
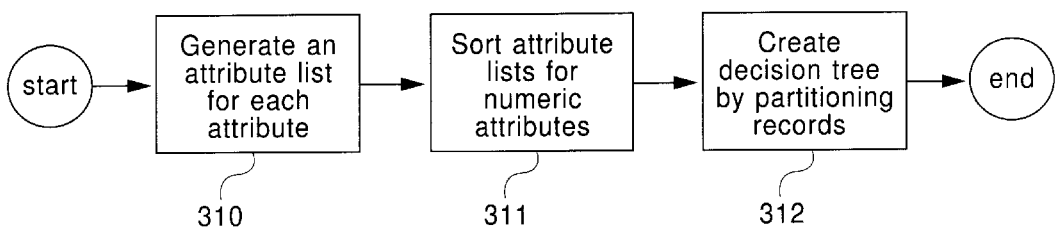
Fig. 3
| Rec.ID | Age | Car Type | Risk |
|---|---|---|---|
| 0 | 23 | family | High |
| 1 | 17 | sports | High |
| 2 | 43 | sports | High |
| 3 | 68 | family | Low |
| 4 | 32 | truck | Low |
| 5 | 20 | family | High |
Fig. 4
| Age | Class | Rec.ID |
|---|---|---|
| 23 | High | 0 |
| 17 | High | 1 |
| 43 | High | 2 |
| 68 | Low | 3 |
| 32 | Low | 4 |
| 20 | High | 5 |
515
| Car Type | Class | Rec.ID |
|---|---|---|
| family | High | 0 |
| sports | High | 1 |
| sports | High | 2 |
| family | Low | 3 |
| truck | Low | 4 |
| family | High | 5 |
516
Fig. 5

Attribute List

Position of cursor in scan

| Age | Class | Rec.ID |
|---|---|---|
| 17 | High | 1 |
| 20 | High | 5 |
| 23 | High | 0 |
| 32 | Low | 4 |
| 43 | High | 2 |
| 68 | Low | 3 |

← position 0

← position 3

← position 6

State of Class Histograms cursor position 0:

$C_{below}$

| High | Low |
|---|---|
| 0 | 0 |

$C_{above}$

| High | Low |
|---|---|
| 4 | 2 | cursor position 3:

$C_{below}$

| High | Low |
|---|---|
| 3 | 0 |

$C_{above}$

| High | Low |
|---|---|
| 1 | 2 | cursor position 6:

$C_{below}$

| High | Low |
|---|---|
| 4 | 2 |

$C_{above}$

| High | Low |
|---|---|
| 0 | 0 |

Attribute List

| Car Type | Class | Rec.ID |
|---|---|---|
| family | High | 0 |
| sports | High | 1 |
| sports | High | 2 |
| family | Low | 3 |
| truck | Low | 4 |
| family | High | 5 |

State of Class Histograms

| | High | Low |
|---|---|---|
| family | 2 | 1 |
| sports | 2 | 0 |
| truck | 0 | 1 |

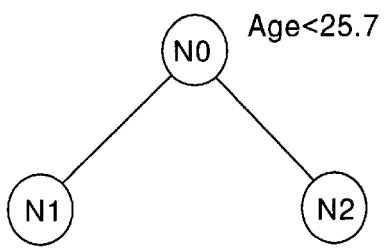

Fig. 13

Attribute lists for node N0

| Age | Class | Rec.ID |
|---|---|---|
| 17 | High | 1 |
| 20 | High | 5 |
| 23 | High | 0 |
| 32 | Low | 4 |
| 43 | High | 2 |
| 68 | Low | 3 |

| Car Type | Class | Rec.ID |
|---|---|---|
| family | High | 0 |
| sports | High | 1 |
| sports | High | 2 |
| family | Low | 3 |
| truck | Low | 4 |
| family | High | 5 |

Fig. 14

Attribute lists for node N1

| Age | Class | Rec.ID |
|---|---|---|
| 17 | High | 1 |
| 20 | High | 5 |
| 23 | High | 0 |

| Car Type | Class | Rec.ID |
|---|---|---|
| family | High | 0 |
| sports | High | 1 |
| family | High | 5 |

Attribute lists for node N2

| Age | Class | Rec.ID |
|---|---|---|
| 32 | Low | 4 |
| 43 | High | 2 |
| 68 | Low | 3 |

| Car Type | Class | Rec.ID |
|---|---|---|
| sports | High | 2 |
| family | Low | 3 |
| truck | Low | 4 |

Fig. 15

| Rec ID | Node |
|---|---|
| 1 | N1 |
| 5 | N1 |
| 0 | N1 |
| 4 | N2 |
| 2 | N2 |
| 3 | N2 |

Fig. 16

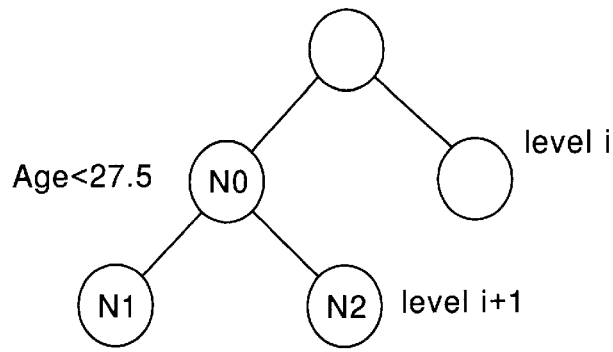

Level i left list for Age attribute

| Age | Class | Rec.ID |
|---|---|---|
| 17 | High | 1 |
| 20 | High | 5 |
| 23 | High | 0 |
| 32 | Low | 4 |
| 43 | High | 2 |
| 68 | Low | 3 |

62

Level i left list for Car Type attribute

| Car Type | Class | Rec.ID |
|---|---|---|
| family | High | 0 |
| sports | High | 1 |
| sports | High | 2 |
| family | Low | 3 |
| truck | Low | 4 |
| family | High | 5 |

63

Level i+1 left list for Age attribute

| Age | Class | Rec.ID |
|---|---|---|
| 17 | High | 1 |
| 20 | High | 5 |
| 23 | High | 0 |

65

Contiguous sections for other nodes precede and follow the above section for node N1.

Level i+1 left list for Car Type attribute

| Car Type | Class | Rec.ID |
|---|---|---|
| family | High | 0 |
| sports | High | 1 |
| family | High | 5 |

67

Contiguous sections for other nodes precede and follow the above section for node N1.

Fig. 18

Level i+1 left list

| Age | Class | Rec.ID |
|---|---|---|
| 17 | High | 1 |
| 20 | High | 5 |
| 23 | High | 0 |

| Car Type | Class | Rec.ID |
|---|---|---|
| family | High | 0 |
| sports | High | 1 |
| family | High | 5 |

All node N1 records are contiguous.
Records for other nodes precede and follow this contiguous section.

Fig. 19

METHOD TO REDUCE I/O FOR HIERARCHICAL DATA PARTITIONING METHODS

The present application claims priority to copending provisional application No. 60/033,659 filed Dec. 17, 1996.

1 FIELD OF THE INVENTION

The invention relates in general to computer databases, and in particular to data mining. The invention specifically relates to an efficient method and system for hierarchical data partitioning of the records independent of the memory size of the system used for partitioning. A specific example of the data partitioning allowed is that used for generating decision-tree classifiers. The data-partitioning may be done in parallel by the processors in a multi-processor system.

2 RELATED PATENTS AND PATENT APPLICATIONS

The present invention is related to the following United States of America Patents and co-pending United States of America patent applications: U.S. Pat. No. 5,799,311, issued Aug. 25, 1998, Ser. No. 646,893, entitled "Method and System for Generating a Decision-Tree Classifier Independent of System Memory Size", by Agrawal et al., filed May 8, 1996, IBM Docket No. AM996023;

Ser. No. 641,404, entitled "Method and System for Generating a Decision-Tree Classifier in Parallel in a Multi-Processor System", by Agrawal et al., filed May 1, 1996, IBM Docket No. AM996015; and U.S. Pat. No. 6,787,274, issued Jul. 28, 1998, Ser. No. 564,694, entitled "Method and System for Generating A Decision Tree Classifier for Data Records Based on a Minimum Description Length (MDL) and Presorting of Records," by Agrawal et al., filed Nov. 29, 1995, IBM Docket No. AM995036. These patents and copending applications are commonly assigned to the assignee of the present invention, and are hereby incorporated by reference in their entirety.

The U.S. Pat. No. 5,799,311, by Agrawal et al., is cited as SPRINT in the rest of this document. SPRINT method refers to the methods described in this patent. SPRINT-PARALLEL refers to the co-pending patent application filed by Agrawal et al. on May 1, 1996 (for a multi-processor system).

3 BACKGROUND OF THE INVENTION

Data mining is an emerging application of computer databases that involves the development of tools for analyzing large databases to extract useful information from them. As an example of data mining, customer purchasing patterns may be derived from a large customer transaction database by analyzing its transaction records. Such purchasing habits can provide valuable marketing information to retailers in displaying their merchandise or controlling the store inventory. Other applications of data mining include fraud detection, store location search, and medical diagnosis.

Classification of data records according to certain classes of the records is an important part of data mining. In classification, a set of example records, referred to as a training set or input data, is provided from which a record classifier will be built. Each record of the training set consists of several attributes where the attributes can be either numeric or categorical. Numeric (or continuous) attributes are those from an ordered domain, such as employee age or employee salary. Categorical attributes are those from an unordered domain such as marital status or gender. One of these attributes, called the classifying attribute, indicates the class to which the record belongs. The objective of classification is to build a model of the classifying attribute, or classifier, based upon the other attributes. Once the classifier is built, it can be used to determine the class of future records.

Some prior art classification methods achieve short training times by creating the classifiers based on decision trees. A decision tree is a class discriminator that recursively partitions the training set until each partition consists entirely or dominantly of records from the same class. The tree generally has a root node, interior nodes, and multiple leaf nodes where each leaf node is associated with the records belonging to a record class. Each non-leaf node of the tree contains a split point which is a test on one or more attributes to determine how the data records are partitioned at that node. Decision trees are compact, easy to understand and to be converted to classification rules, or to Structured Query Language (SQL) statements for accessing databases.

For example, FIG. 1 shows a training set where each record represents a car insurance applicant and includes three attributes: Age, Car Type, and Risk level. FIG. 2 shows a prior art decision-tree classifier created from the training records of FIG. 1. Nodes 202 and 203 are two split points that partition the records based on the split tests (Age<25) and (Car Type in {Sports}), respectively. The records of applicants whose age is less than 25 years belong to the High Risk class associated with node 204. The records of those older than 25 years but owning a sports car belong to the High Risk class associated with node 205. Other applicants fall into the Low risk class of node 206. The decision tree then can be used to screen future applicants by classifying them into the High or Low Risk categories.

Two of the patent applications filed by Agrawal et al. remove all system memory size limitations in generating decision-tree classifiers. At the same time, they address issues of efficiency and scalability to large training sets that do not fit in system memory. One of patent applications (Ser. No. 641,404) addressed the issue of using a multi-processor system. However, the amount of time spent on I/O from disk to system memory may still be quite excessive.

"Fast Serial and Parallel Classification of Very Large Data Bases," Proc. of the Very Large Database Conference, 1996, by Shafer et al. is referenced herein as SPRINT-paper. This paper describes work related to the two co-pending patent applications filed by Agrawal in 1996 (cited in the Related Applications section).

Therefore, there remains a need to reduce the I/O requirements in order to significantly improve the performance of the classifier.

4 SUMMARY

It is an object of the present invention to provide an efficient method for generating a decision-tree classifier from a training set of records, independent of the system memory size, for classifying future records of unknown classes.

Another object of the present invention is to obtain a decision-tree classifier that is compact, accurate, and has short training times.

Still another object of the present invention is a method for generating a classifier that is scalable on large disk-resident training sets.

Yet another object of the present invention is a method for generating a classifier that minimizes the I/O time for reading and writing disk-resident data.

The present invention achieves the foregoing and other objects by providing a method for generating a decision-tree classifier from a training set of records. Each record includes one or more attributes, a class label to which the record belongs, and a record ID. In accordance with the invention, the method includes a step of generating an attribute list for each attribute of the training records. Each entry in the attribute list includes a value of that attribute, and the class label and record ID of the record from which the attribute value came from. The attribute lists for numeric attributes are sorted based on attribute value. A decision tree is then generated by repeatedly partitioning the records according to record classes, using the attribute lists. The final decision tree becomes the desired classifier in which the records associated with each leaf node are of the same class.

The decision tree is created by repeatedly splitting the records at each examined node, starting with the root node. At any examined node, a split test is determined to best separate the records at that node by record class, using the attribute lists. The node's records are split according to the best split test into partitions of records to form child nodes of the examined node, which also become new leaf nodes of the tree. This splitting process continues for the new leaf nodes until each leaf node contains records of a single class. Preferably, the split tests are determined based on a splitting index corresponding to the criterion used in splitting the records. The index may be a gini index based on the relative frequency of records from each class present in the training set.

In addition, for each attribute, each leaf node includes one or more variables, such as histograms, representing the distribution of the records at that leaf node or its children. In determining a split test, the attribute list for each attribute A is scanned. For each value v of A in the attribute list, the class histograms for A at the examined node are updated using the class label corresponding to v and the value v. If A is a numeric attribute, then the splitting index for the splitting criterion (A≦v) for the examined node is calculated. If A is categorical, then a subset of the attribute A resulting in the highest splitting index for the examined node is determined.

The desired subset of A is determined by considering various subsets of a set S of all A values as possible split points. If the number of values of A is less than a certain threshold, then all subsets of the set S are evaluated to find one with the highest splitting index for the examined node. If the number of values is equal to or more than the threshold, each value of A from the set S is added, one at a time, to an initially empty set S' to find a split with the highest splitting index.

In accordance with the invention, the partitioning of records at each node includes, for an attribute B used in the respective split test, dividing the attribute list for B into new attribute lists corresponding respectively to the child nodes of the examined node. In dividing the attribute list, the method traverses the list to apply the split test to each entry in the list and puts the entry into a respective new list according to the test. In addition, a hash table is created with the record IDs from the attribute list as the list is being divided, which is then used for splitting the remaining attribute lists of the examined node among its child nodes. The method also updates the histograms of the potential grandchild nodes with the distributions of records at these nodes.

The present invention reduces I/O time significantly, which in turn is a significant part of the overall execution time. This time reduction is achieved by reduction in the number of reads from disk, writes to disk, and by using a suitable layout of data on disk to reduce seeks of the disk head. Our improved method applies to both a single processor system and a multi-processor system.

The present invention minimizes I/O read time by combining the read required for splitting a node and the read required for determining the split test for the child nodes. Further, the present invention reduces I/O write time by not requiring writes for child node records during splitting at every level of the decision tree. In particular, writes may be required only once in n levels where n≧2. The write reduction requires slightly larger hash tables and the hash tables must be retained (in system memory or disk) while the child nodes are not being written. Further, the present invention minimizes disk seek time by using a novel data layout on disk for the classification data structures. Moreover, the present invention allows the above three I/O optimizations to be used in a very general setting for hierarchical data partitioning problems. The optimizations also work in a multi-processor system. Finally, any pruning method may be used to prune the decision tree generated as described above.

Additional objects and advantages of the present invention will be set forth in the description which follows, and in part will be obvious from the description and with the accompanying drawing, or may be learned from the practice of this invention.

5 BRIEF DESCRIPTION OF THE DRAWINGS

These and other features and advantages of the present invention will become apparent from the following detailed description taken in conjunction with the accompanying drawings, wherein:

FIG. 1 shows an example of a prior art training set of records.

FIG. 2 illustrates a prior art decision tree corresponding to the training set of FIG. 1 in which each leaf node represents a class of records.

FIG. 3 is a flow chart showing the overall generation of decision trees.

FIG. 4 illustrates an exemplary training set of records for use with the method of the invention.

FIG. 5 illustrates the attribute lists generated by the system, according to block 310 of FIG. 3.

FIGS. 9a and 9b illustrate a numeric attribute list and the state of the class histograms corresponding to three exemplary locations in the attribute list while the list is being traversed, according to block 31 of FIG. 8.

FIGS. 10a and 10b illustrate a categorical attribute list and the corresponding histogram, according to block 31 of FIG. 8.

FIG. 12b is a flow chart for splitting the attribute list of the splitting attribute, according to block 150 of FIG. 12a.

FIG. 12c is a flow chart for splitting the other attribute lists—not for the splitting attribute, according to block 152 of FIG. 12a.

FIG. 13 illustrates a decision tree being created as the records at node N0 are split to form child nodes N1 and N2, according to block 122 of FIG. 7b.

FIG. 14 shows the attribute lists corresponding to node N0 shown in FIG. 13, which are the same as the original attribute lists illustrated in FIG. 6.

FIG. 15 shows how the attribute lists of the node N0 are partitioned into new attribute lists for its child nodes N1 and N2, according to blocks 150 and 152 of FIG. 12a.

FIG. 16 illustrates a typical hash table created according to block 51 of FIG. 12a.

FIG. 18 is the data layout of records on disk in the SPRINT-paper.

FIG. 19 is the data layout according to the present invention of attribute records on disk.

6 DESCRIPTION OF THE PREFERRED EMBODIMENT

The present invention is primarily described as a method for generating a decision-tree classifier from a training set of records, independent of the memory size of the system performing the method. However, persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

FIG. 3 illustrates a high-level flow chart of the method for generating a decision-tree classifier from a training set of records, in accordance with the invention. Each record has one or more data attribute values, a class label of the class to which the record belongs, and a record ID. An attribute may be numeric (or continuous) such as Age, or categorical such as Car Type. Beginning with block 310, the method generates an attribute list for each attribute of the records. Each entry in an attribute list has an attribute value, class label, and record ID of the record from which the attribute value is obtained. The attribute lists are described in more detail below in accordance with FIGS. 5 and 6.

At block 311, the attribute lists for numeric attributes are sorted based on attribute value. By initially sorting the numeric attribute lists once, future attribute lists created from the original lists will not need to be sorted again during the evaluation of split tests at each leaf node. A decision tree is next generated by repeatedly partitioning the records using the attribute lists, as shown by block 312. The algorithm for generating the decision tree is described further below in reference to FIGS. 7 through 16. The resulting decision tree after all record classes are identified becomes the decision-tree classifier.

Figures 6, 7A:
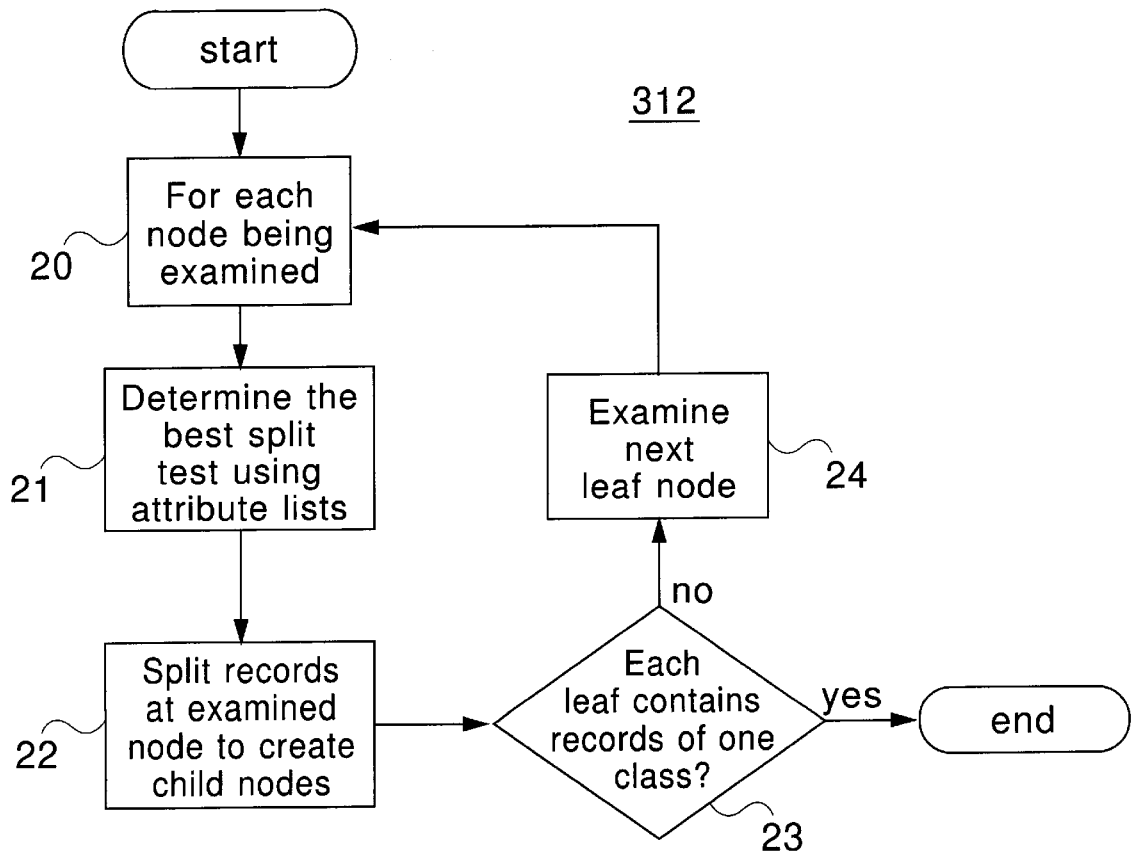
FIG. 6 shows the attribute lists from FIG. 5 after the attribute list for the numeric attribute is sorted, according to block 311 of FIG. 3.
FIG. 7a is a flow chart showing further details for the step of creating the decision tree, from block 312 of FIG. 3.

FIG. 4 illustrates an example of a training set of records for use with the method of the invention. Each record represents a car insurance applicant with the values of two attributes Age and Car Type, and a class label indicating the Risk level for the applicant. In this case, Age is a numeric attribute indicating the applicant's age, while Car type is a categorical attribute indicating the type of the applicant's car. FIG. 5 represents the attribute lists generated from the training records of FIG. 4, according to block 310 of FIG. 3. The attribute lists 515 and 516 correspond respectively to the numeric attribute Age and categorical attribute Car Type. FIG. 6 shows the same attribute lists from FIG. 5 after the attribute list 618 for the numeric attribute Age has been sorted, in accordance with block 311 of FIG. 3.

6.1 Reduction in Reads From Disk

FIG. 7a illustrates a high-level flowchart (from SPRINT) for the step of generating a decision tree from the records and attribute lists, from block 12 of FIG. 3. Generally, the method recursively examines each leaf node to determine a split point that best separates the records at the node by record class. The partitions of records form new leaf nodes of the tree. This process continues until the records at each leaf node are entirely or dominantly from the same class. Note that initially, the tree is viewed as having a single leaf node that is also the root node.

Starting with block 20, for each leaf node being examined, the method (in SPRINT) determines a split test to best separate the records at the examined node using the attribute lists, as shown by block 21. The determination of the split tests is described further below. At block 22, the records at the examined leaf node are partitioned according to the best split test at that node to form new leaf nodes, which are also child nodes of the examined node. The records at each new leaf node are checked at block 23 to see if they are of the same class. If this condition has not been achieved, the splitting process is repeated starting with block 24 for each newly formed leaf node until each leaf node contains records from one class.

In finding the best split test (or split point) at a leaf node, a splitting index corresponding to a criterion used for splitting the records may be used to help evaluate possible splits as described in SPRINT). Although various indices may be used, the splitting index is preferably a gini index as described, for example, by Brieman et al. in "Classification and Regression Trees, Wadsworth, 1984."

Figure 7B:
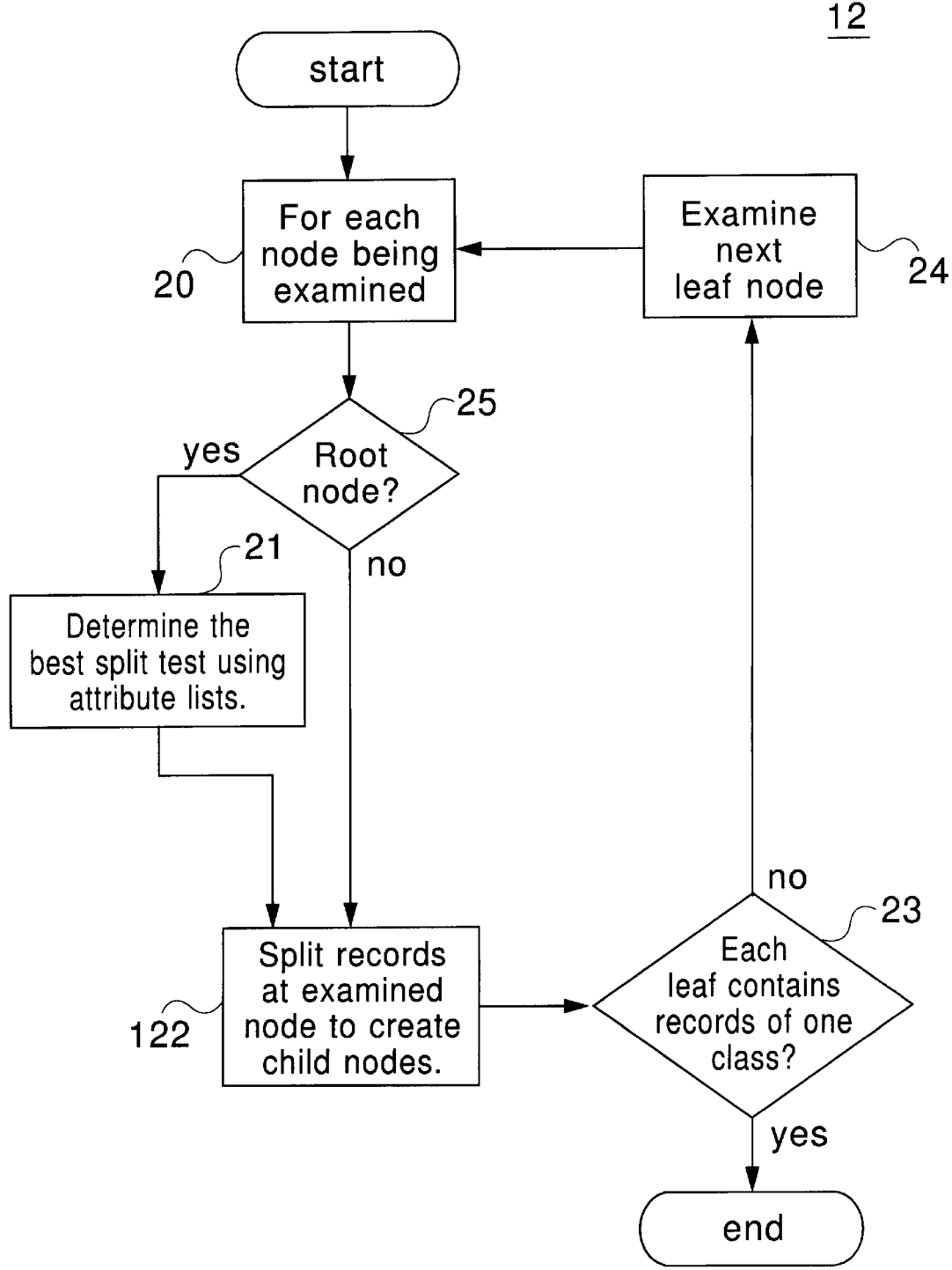
FIG. 7b is an alternative flow chart according to the present invention showing further details for the step of creating the decision tree, from block 312 of FIG. 3.

FIG. 7b illustrates an alternative high-level flowchart that incorporates the read optimization of the present invention to advantangeously reduce disk reads (compared to SPRINT). In block 25, the root node requires that the best split be determined as before in block 21. According to the present invention, however, block 122 combines the splitting of records for the node being examined with the determination of the best splits of the child nodes. Note that in SPRINT, two reads are necessary for the records associated with each node (one for determining the best split test in block 21 and the other for splitting records in block 22 in FIG. 7a), whereas the method of the present invention requires only one read for all non-root nodes.

Figure 8:
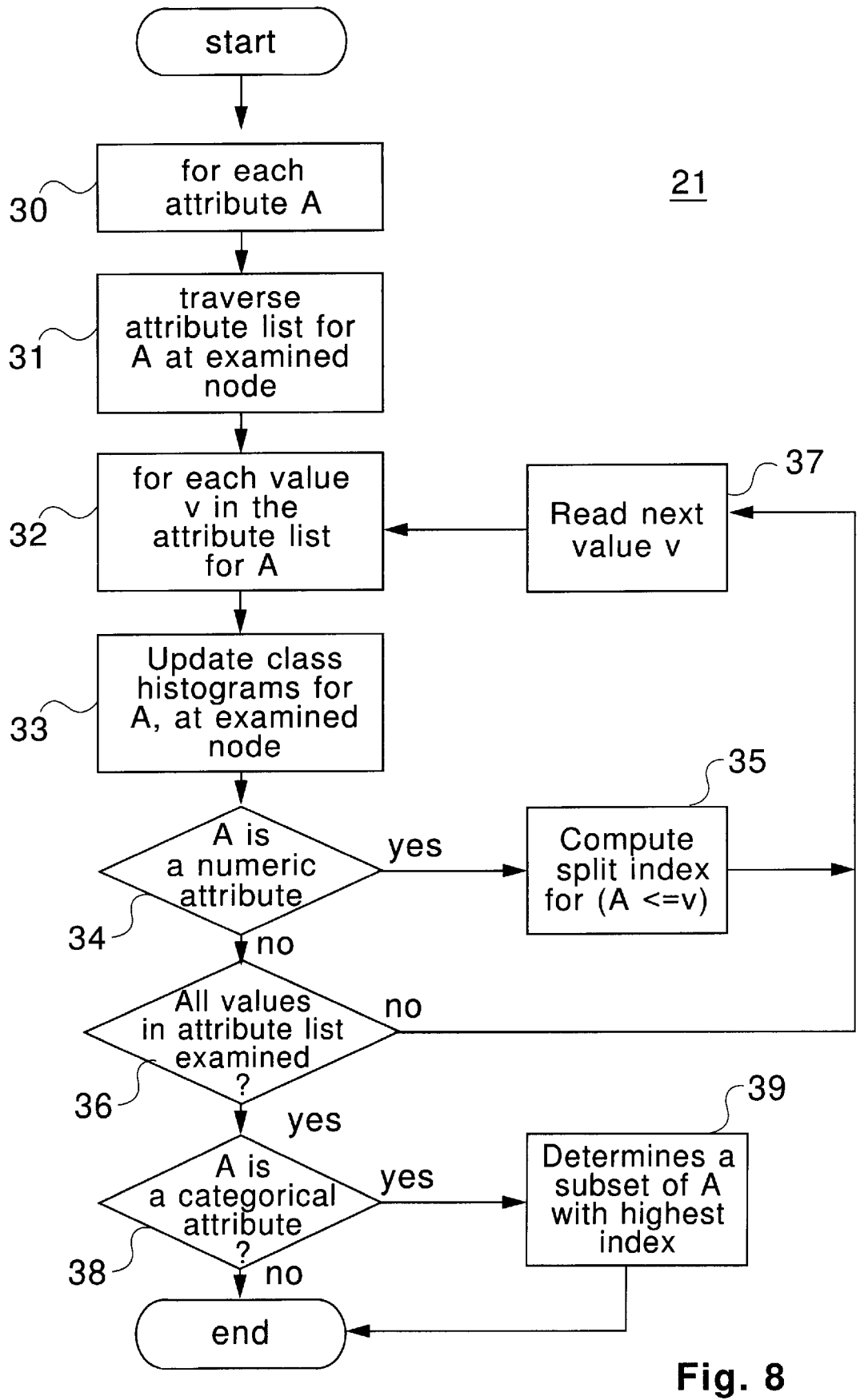
FIG. 8 is a flow chart showing further details for the step of determining a split test at each examined node, from block 21 of FIG. 7b.

FIG. 8 shows further details for the step of determining a split test from block 21 of FIG. 7b. To help evaluate the split tests, a variable indicating the distribution of records by record class at each leaf node may be used. For example, each leaf node may have a histogram for each categorical attribute showing the class distribution of the records at that node. For a numeric attribute, two histograms $C_{below}$ and $C_{above}$ are typically maintained that are initialized respectively to zero and the distribution for all the records at the leaf node.

Starting with block 30 of FIG. 8, the attribute list for each attribute A at the examined node is traversed, as shown in block 31. For each value v in the attribute list, the class histograms for A at the examined node are updated with the class label corresponding to v and the value v, as shown by block 33. If A is determined in block 34 to be numeric, the splitting index for the splitting criterion (A≦v) at the examined node is computed at block 35. Another attribute value v is then examined, at block 37, until the complete list is traversed, at block 36. If A is a categorical attribute, the method determines in block 39 a subset of the attribute A that would result in the highest splitting index for the examined node. The determination of this subset is further described below in reference to FIG. 11.

FIGS. 9a and 9b illustrate how the histograms for the numeric attribute Age are updated according to block 33 of FIG. 8. In FIG. 9a, the attribute list for Age from FIG. 6 is shown again with three illustrative cursor positions while the list is being traversed per block 31 of FIG. 8. FIG. 9b shows the state of the $C_{below}$ and $C_{above}$ histograms for the attribute Age that correspond to the three cursor positions of FIG. 9a, after the histograms are updated according to block 33 of FIG. 8.

Similarly, FIGS. 10a and 10b illustrate the attribute list for the categorical attribute Car Type and its corresponding histogram (or count matrix). In FIG. 10a, the attribute list for Car Type is reproduced from FIG. 6. The histogram for Car Type is shown in FIG. 10b after it is updated according to block 33 of FIG. 8.

Figure 11:
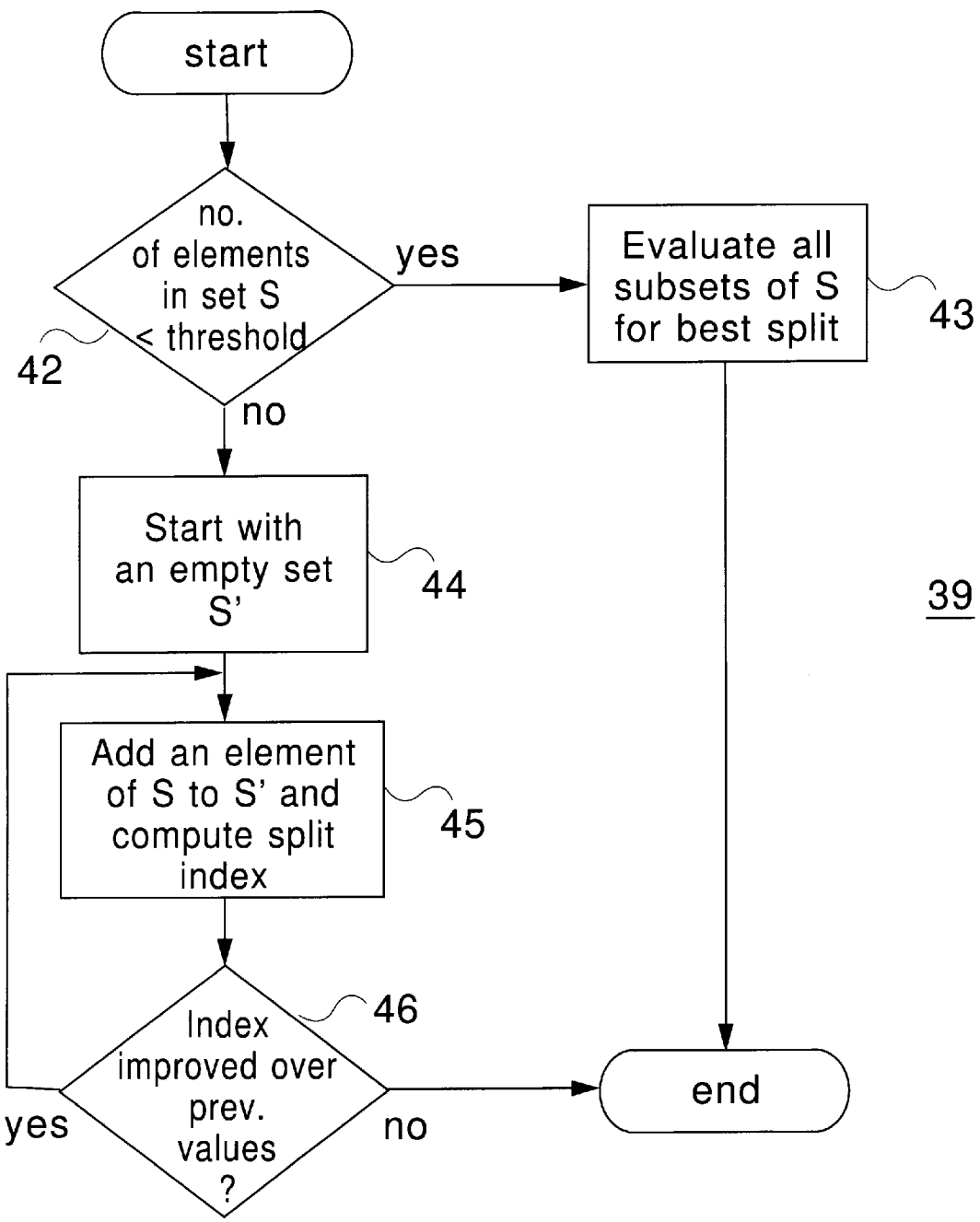
FIG. 11 is a flow chart showing further details for the step of determining a subset of the attribute values with the highest splitting index, from block 39 of FIG. 8.

Referring now to FIG. 11, a preferred embodiment for block 39 of FIG. 8, for determining a subset of a categorical attribute A with the highest splitting index, is shown in the form of a flow chart. The splits for a categorical attribute A are of the form A∈S', where S'⊂S and S is the set of all possible values of the attribute A. Since the evaluation of all the subsets of S can be prohibitively expensive, especially if the number of elements in S (the cardinality of S) is large, the method uses a hybrid approach where it only evaluates all the subsets of S if the cardinality of S is less than a certain threshold.

Starting with block 42, the cardinality of the set S is compared to the predetermined threshold. If the cardinality is less than the threshold, then all the subsets of S are evaluated to find the best split for the records, at block 43. Otherwise, a greedy algorithm may be used for subsetting. For instance, starting with an empty set S' at block 44, each element of set S is added to S', one at a time, and a corresponding splitting index is computed at block 45. This incremental addition to S' continues until there is no further improvement in the splitting index, as determined at block 46.

Figure 12A:
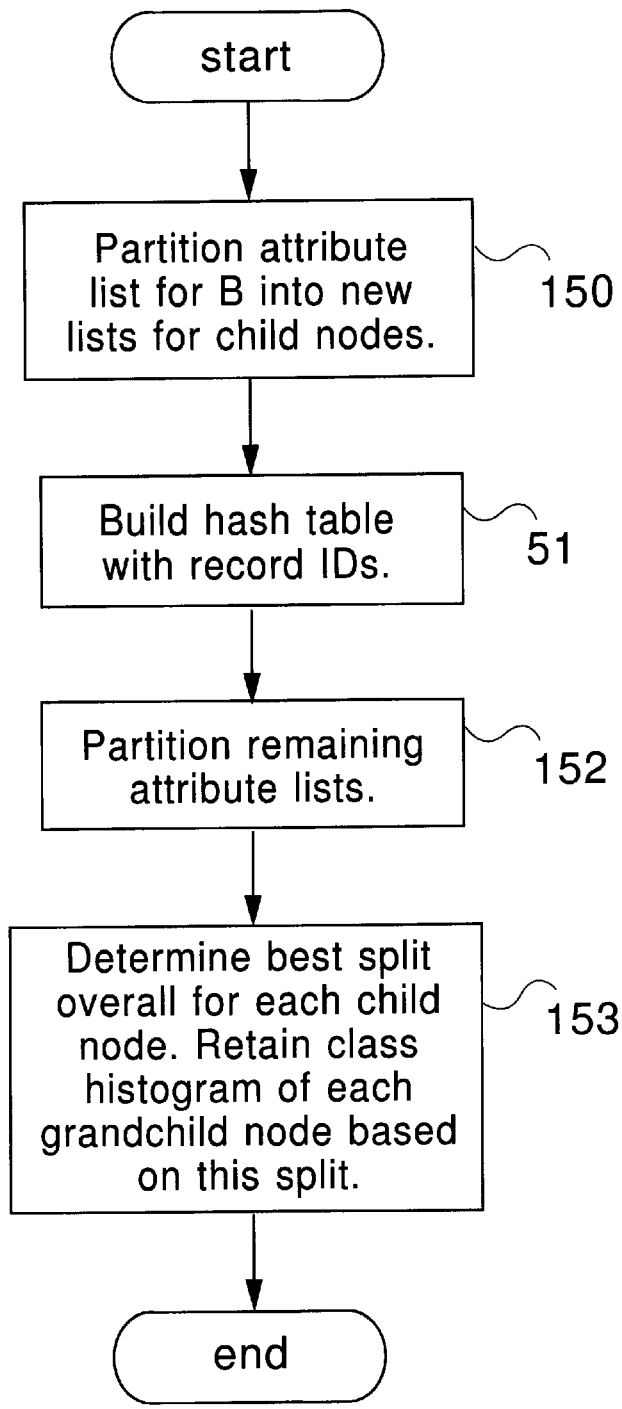
FIG. 12a is a flow chart showing further details for the step of splitting nodes in the decision tree, according to block 122 of FIG. 7b.

Referring now to FIG. 12a, further details for the step of splitting the records, per block 122 of FIG. 7b, are shown. At block 150, the attribute list for an attribute B used in the split test is partitioned into new attribute lists, one for each child node of the examined node. Typically, the method traverses the attribute list, applies the split test to each entry in the list, and puts the entry into a respective new list according to the test result. Also, a hash table is created in block 51 using the record IDs from the entries of the attribute list for B as the entries are distributed among the new attribute lists. Based on this hash table, the remaining attribute lists at the examined node are partitioned among the child nodes of the examined node, as shown by block 152. According to the present invention and as described in more detail in FIGS. 12b and 12c, blocks 150 and 152 respectively include the determination of the best split using each attribute list separately for each of the child nodes. In block 153, after all attribute lists are partitioned, the overall best split using all attribute lists is determined for each child node. At the same time, the class histogram of each grandchild node is retained based on this overall best split of each child node. These class histograms of the grandchild nodes are by-products of the processing done in FIG. 12a for finding the best split at the child nodes in blocks 150 and 152.

Figure 12B:
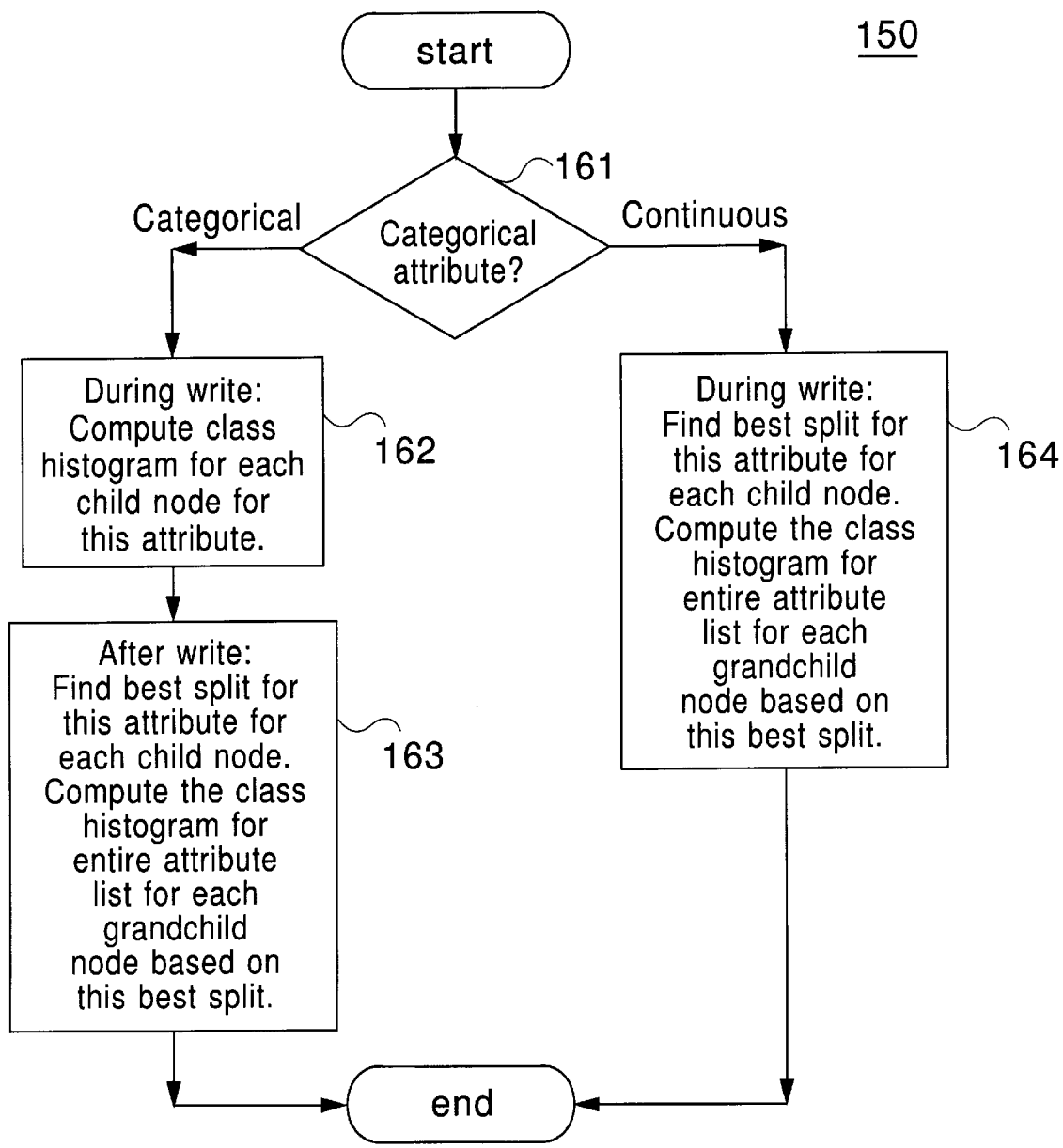

FIG. 12b depicts a detailed flowchart for block 150 in FIG. 12a (to split the attribute list associated with the best split which is also called the splitting attribute list). Block 162 includes the following blocks in FIG. 8 to find the best split for a node: blocks 31, 32, 33, 36, and 37 (i.e., all the blocks associated with histogram computation for categorical attributes). Note that the class histogram for a categorical attribute is equivalent to a count matrix, i.e., a matrix that gives the counts of the number of training records for all values of the categorical attribute in question. See FIGS. 10a and 10b for examples of a categorical attribute list and its corresponding class histogram. Block 163 includes block 39 as described in FIGS. 8 and 11 to find the best subset of the categorical attribute list for splitting purposes (i.e., the subset with the highest split index). In blocks 163 and 164, "class histogram for entire attribute list" for a node is simply the counts of the training records that fall in each class for that node. For continuous attributes (as in block 164), it is equivalent to $C_{above}$ in FIG. 9b when the cursor position is 0 or the beginning of the attribute list. It is also equivalent to $C_{below}$ when the cursor position is at the end of the attribute list. Block 164 includes the following blocks in FIG. 8 to find the best split for a node: 31, 32, 33, 35, 37 (i.e., all the blocks associated with histogram computation for numeric attributes). Compared to SPRINT, the unique aspects of FIG. 12b are blocks 163 and 164 where the best split is found for child nodes during the split itself. Moreover, the class histogram for the grandchild nodes is found during the split itself.

Figure 12C:
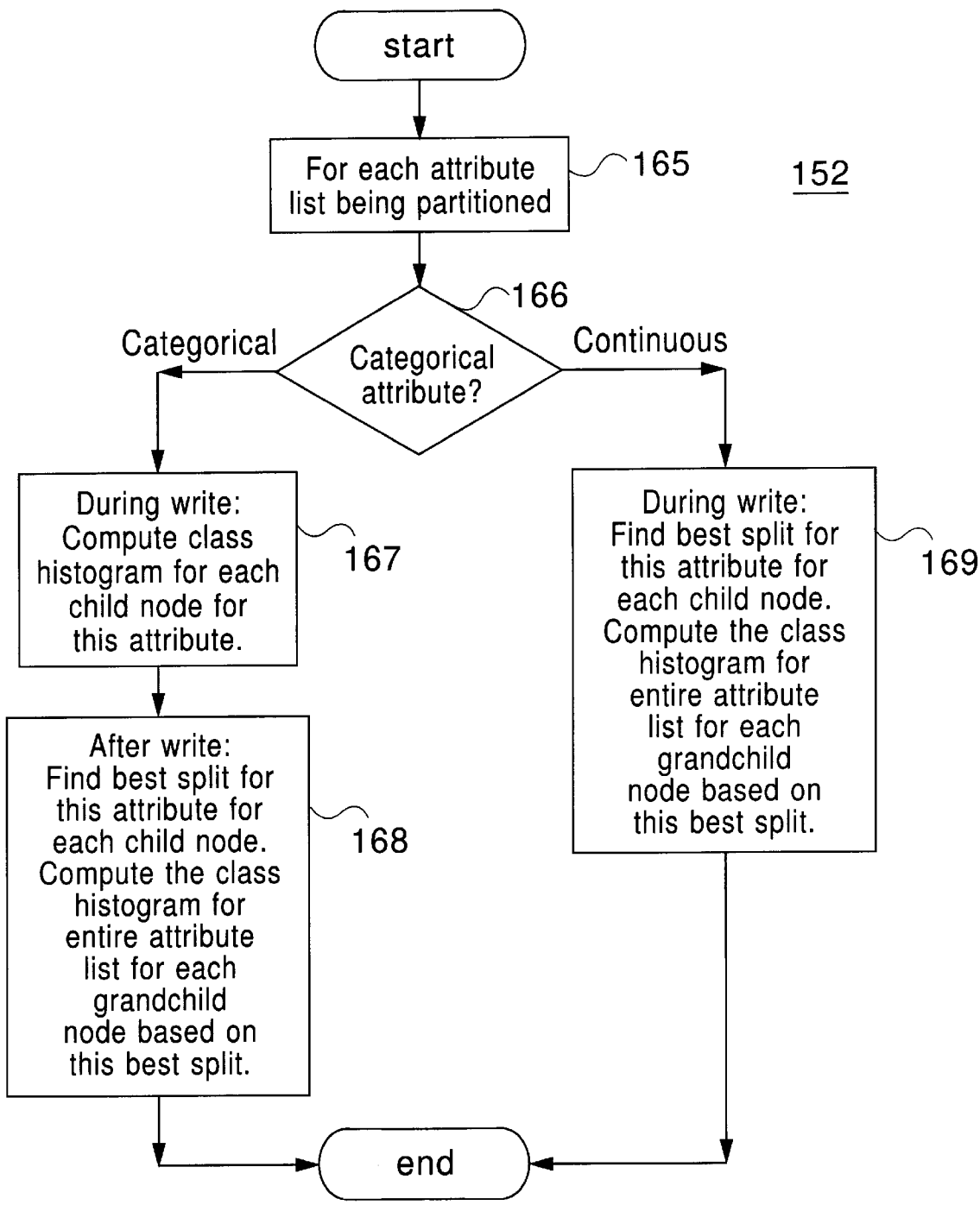

A detailed flowchart for block 152 is given in FIG. 12c. In block 165, each attribute list other than the splitting attribute list is partitioned here. Otherwise, this flowchart is identical to that described in FIG. 12b.

FIGS. 13–16 illustrate how a node's attribute lists are partitioned into new attribute lists for its child nodes, according to the steps described in reference to FIG. 12a. FIG. 13 shows a node N0 and its two child nodes N1 and N2 generated by the split test (Age<27.5). As an example, assume that the records at node N0 are the same as those in FIG. 4. The attribute lists at node N0 are therefore the same as those in FIG. 6 and are reproduced in FIG. 14. The attribute lists for the child nodes N1 and N2 are shown in FIG. 15. The Age attribute lists 65 and 66 correspond respectively to nodes N1 and N2, and are created when the attribute list 62 of FIG. 14 is partitioned per block 150 of FIG. 12a. The Car Type attribute lists 67 and 68 correspond to nodes N1 and N2, respectively, and are created when the attribute list 63 is partitioned per block 152 of FIG. 12a. A typical hash table formed according to block 51 of FIG. 12a is shown in FIG. 16.

In order to obtain a compact classifier, the decision tree as created may further be pruned to remove extraneous nodes. This can be done as described in SPRINT. Further, one skilled in the art will realize that the read optimization features of the present invention will also work in a multi-processing environment such as is described in SPRINT-PARALLEL. In fact, other optimizations to be described later will also work with the pruning techniques and multi-processing environments described in SPRINT and SPRINT-PARALLEL.

6.2 Reduction in Writes to Disk

Figure 17A:
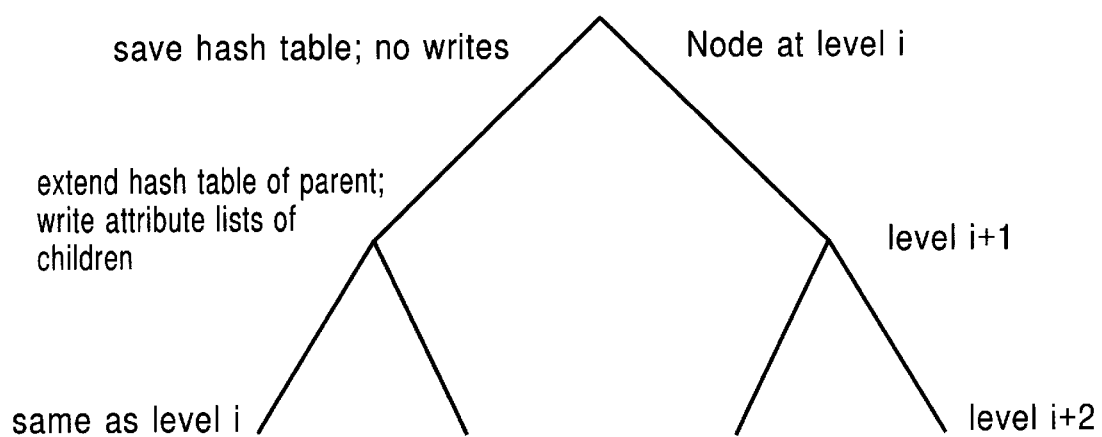
FIG. 17a shows how to eliminate writes at alternating levels of the decision tree.

FIG. 17a shows a node at level i being split into two nodes at level i+1 and then each of the two nodes at level i+1 is further split into two nodes each at level i+2. Only one bit is needed in the hash table at level i to indicate whether a particular record belongs to the left or right child. If the same hash table at level i is to be used to represent the grandchild node (one of four) to which a particular record belongs, then one additional bit (i.e., two bits total) is required.

It is possible to eliminate the writes at every alternate level of the decision-tree using the following method. Referring again to FIG. 17a, let's say the writes are eliminated at level i. However, the hash table computed at this level is saved for the processing of the next level i+1. All other processing is done as before in FIG. 7b. For the next level i+1, the attribute list of the splitting attribute is read from the corresponding attribute list of the parent node at level i. Since this is larger than the corresponding data chunks of the same type at level i+1, this requires extra reads. The hash table for level i+1 is computed by extending the hash table for the parent node. For a binary tree, this requires just one extra bit per hash table entry. All splits of other attribute lists (other than the splitting attribute list) at level i+1 into nodes at level i+2 can now use the extended hash table of the parent node at level i.

Figure 17B:
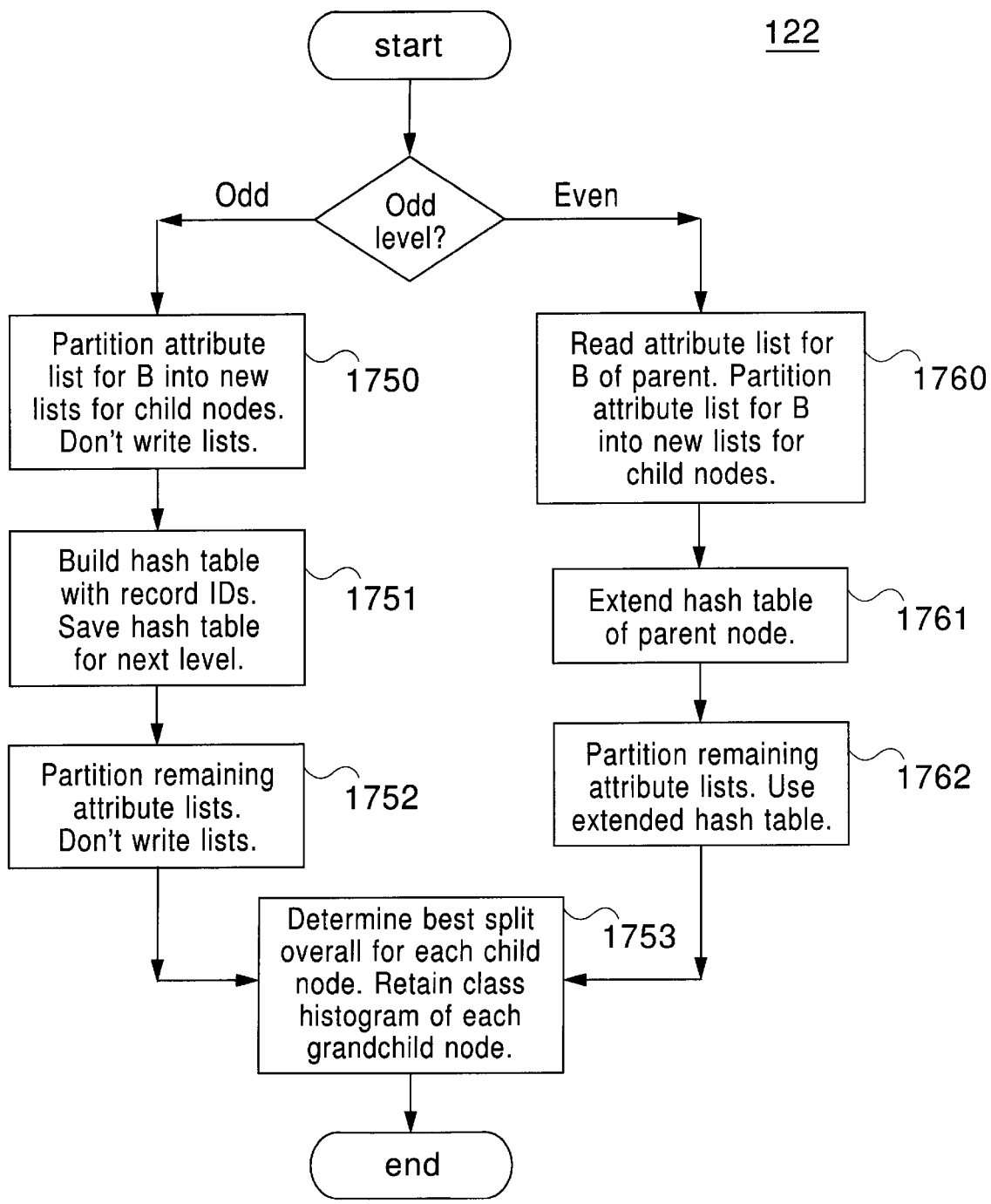
FIG. 17b is a flow chart for splitting attribute lists with less writes.

FIG. 17b shows an alternative flowchart to that described in FIG. 12a for splitting attribute lists at a node. When the level of the tree is Odd, blocks 1750, 1751, and 1752 are used. In blocks 1750 and 1752, the attribute lists are not written as they were in blocks 150 and 152 in FIG. 12a. In block 1751, the hash table is saved so it can be used at the following level (an Even level). When the level is Even, blocks 1760, 1761, and 1762 are used. In block 1760, the attribute list for the splitting attribute list is not available directly since it was not written at parent's level (an Odd level). Therefore, the parent's attribute list is read instead. The hash table indicates which part of the parent's attribute list belongs to the current node and which belongs to the sibling node. The split is four-way now. The attribute lists for the child nodes are written at this Even level. In block 1761, the hash table for the parent node is extended to indicate the child node (two levels below the parent node) where each data record belongs. In block 1762, we use the extended hash table of the parent to decide how to split the other attribute lists (which are read from the parent). Again, we do write the attribute lists of the child nodes since this is an Even level. The split is four-way.

Clearly, if the hash table fits in main memory, there is a clear reduction in the number of writes (which remain sequential). Also, the extra reads mentioned above become less significant as the number of data types increases. If the hash table does not fit in main memory, more analysis is necessary to determine whether this write-reducing technique will improve or degrade performance.

One disadvantage of this technique can be illustrated for a binary tree. Without the write-reducing technique, the writes have to be in two locations for each of the two children. Now, the writes have to be in four locations for each of the four grandchildren. If a single disk is used, the head will go back and forth between the four locations. Certainly, the writes at each location will be buffered so the performance loss may not be significant. Further, if two separate disks were previously used to pipeline the writes with the reads, now four separate disks could similarly be used to pipeline the writes with the reads.

Finally, this write-reducing technique can be generalized to require one write for every n contiguous levels where n>2. The number of bits in the hash table increases and the number of locations for the writes increases compared to the case where n=2.

6.3 Reductions in Disk Seeks While Reading From Disk

A specific layout of the attribute records on disk will now be described which reduces the number of seeks as compared to alternative formulations such as that described in SPRINT-paper. The formulation described in the SPRINT-paper organizes the data so that one does not have a different list for each attribute for each node. Instead, there are four lists for each attribute type. One list is used for all leaves that are "left" children and another list for all leaves that are "right" children. The other two lists serve as alternates. When reading records for a particular node, they read the corresponding portion of the attribute's left or right list. When splitting and writing a node's attribute records, they append the left and right child's records to the end of the alternate left and right lists. After splitting each node, the roles of the alternate and primary lists are reversed. FIG. 18 depicts a node N0 being split into two nodes N1 (left child) and N2 (right child). Node N0 is itself the left child of another node. The left lists for attributes "Age" 62 and "Car Type" 63 are shown at level i. The records for node N0 are contiguous. The left lists for the "Age" 65 and "Car Type" 67 attributes are also shown at level i+1.

FIG. 19 depicts an example of a disk layout having features of the present invention for reducing disk seeks—an important timing consideration for disk-resident data. The difference is that there are four lists total as opposed to four for each attribute as in SPRINT-paper. Also, for each list, all records of a particular node are present, then all records for the next node, and so on.

Within the contiguous section for a particular node, there are contiguous sections for each of the attribute types for that node. As depicted, the left list at level i+1 contains a contiguous section with all records for node N1. Within the contiguous section for node N1, all records for attribute "Car Type" 67 follow all records for attribute "Age" 65. Similar contigous sections for other "left" nodes at level i+1 precede and follow the contiguous section for node N1. The right list at level i+1 is similarly organized.

Let's say there are n leaves of the tree at level i and these are being split into children at level i+1. Also, let k be the number of attribute types. Consider the blocks in the flowchart of FIG. 12a. Performing blocks 150, 51, and 152 will take $c_1 \times k \times n$ (plus some lower complexity additive terms) disk seeks using the disk layout in FIG. 18, where $c_1$ is a small constant. In contrast, using the disk layout of the present invention, only $c_2 \times n$ seeks are required, where $c_2$ is a small constant.

There are additional advantages of the layout of the present invention. First, there are fewer reads and writes of the hash tables generated in block 51. Consider the case where one single hash table for one node fits in main memory but all the combined hash tables for the nodes at a particular level do not. Using the layout in FIG. 18, block 51 will need to write some hash tables for some nodes to disk. Block 152 will require that these hash tables be read back repeatedly. According to the present invention, hash tables do not need to be written to disk at all. Consequently, they do not need to be read from disk either. Blocks 150, 51, and 152 can all be done for one node at a time with a constant number of seeks. The hash table generated in block 51 can advantageously be kept in main memory during these steps. When these steps are completed for a particular node, the hash table can simply be deleted. When another node is to be processed using blocks 150, 51, and 152, the space for the previous hash table can be reused. Note that this advantage with hash tables will apply to any hash table that does fit in main memory even if it does not apply to all of them.

A second advantage of the disk layout of the present invention is that the processing of each node is decoupled from the processing of other nodes at the same level. Therefore, other orderings are easily allowed in the decision-tree generation. As opposed to breadth-first order, for example, an arbitrary order can be allowed. In other words, it is not necessary to process all nodes at level i before processing any nodes at level i+1.

6.4 Generalization of Improvements to a Hierarchical Data Partitioning Problem

Within this section, a generalized formulation of the decision-tree classification problem is described. Specifically, the problem is generalized to a data partitioning problem. Data is partitioned hierarchically in a tree starting with all the data at the root. At each non-leaf node, data is split p-ways. First, the general problem definition is described in Section 6.4.1. Next, the original SPRINT method is described in Section 6.4.2 using the general formulation. Finally, the read reduction optimization is described using this general formulation in Section 6.4.3. The other two optimizations—write reduction and reduction in disk seeks—can be generalized in a similar fashion by one of ordinary skill in the art.

6.4.1 Generalized Problem Definition

Data is assumed to be of M types. Each of these types represents a separate chunk of data stored on secondary storage. Data may be sorted or not. If it is sorted, then we can assume that a subsequent split may retain the sorted nature of each of the resultant split chunks of data without requiring additional sorting.

Whatever information or processing has to be done on a chunk of data can be done incrementally by a scan of the data chunk if the pre-requisites for this analysis are already present.

There exist one-to-one functions which map elements of data type i to elements of data type j $\forall i, j$.

A particular information termed $INFO_1$ can be generated by reading any particular subset from a set of subsets of the data. The particular subset chosen from the subset for accomplishing this is referred to as $SUBSET_1$.

The processing is divided into stages. At each stage a particular data type is split into p parts. Each of the respective p parts of each data type forms a new data set on which all of the above is recursively applied.

The splitting in p parts requires generation of information termed $INFO_2$ from a subset termed $SUBSET_2$ of the M types. $INFO_2$ can be generated piecemeal separately from each data type belonging to $SUBSET_2$ and combining it later.

$INFO_2$ is further composed of $INFO_1^2$ calculated from $SUBSET_1^2$ and $INFO_2^2$ calculated from $SUBSET_2^2$ $INFO_1^2$ can be calculated directly without any prerequisite while calculation of $INFO_2^2$ requires $INFO_1$ first as a prerequisite.

There exists a subset termed $SUBSET_3$ of datatypes for which the split can be done directly, based on $INFO_2$. While one of these datatypes are being split, a particular series of one-to-one functions is created to represent the splitting partition.

The set ALLDATA—$SUBSET_3$ can only be split by using the one to one function of an element of $SUBSET_3$.

If an option of choosing one among the possible subsets is available, that subset is chosen which minimizes the new data to be read for generating the information.

6.4.2 SPRINT Method

We first describe how SPRINT is mapped to the general formulation and then we show the SPRINT method using the generalized formulation.

1. Each of the M types refer to each of the separate attribute list.
2. All splits are binary (i.e., p=2).
3. Incremental generation of information refers to the fact that in the presence of prerequisites, only a sequential scan of each of the attributes list is needed.
4. A one-to-one mapping in the form of transaction ID's exists between different attribute lists.
5. $INFO_1$ refers to the class histogram for any single, complete attribute list ($C_{above}$ for cursor position 0) required for calculation of gini-indices of the continuous attributes. $SUBSET_1$ is any single attribute.
6. $INFO_2$ are the gini indices for the best split of all of the attribute lists.
7. $INFO_1^2$ is the gini index for categorical attributes. It's calculation does not require the class histogram of the entire attribute list. $SUBSET_1^2$ is the set of all categorical attribute lists.
8. $INFO_2^2$ is the gini index for continuous attributes. It requires the class histogram of the entire attribute list. $SUBSET_2^2$ is the set of all continuous attribute list.
9. $SUBSET_3$ is the attribute on which the split has to be made. One can use a logical function straight away to split this list into p parts.
10. The rest of the attribute lists require the one-to-one function from the splitting attribute to split them.

SPRINT Method

Root Node Function Driver($D_1, \ldots, D_M$)
  1. $\forall$ Datatype i, i $\in$ $SUBSET_1$
    Read(sequentially) $D_i$.
    Generate part of $INFO_1$.
  2. function old_split ($D_1, \ldots, D_M$, $INFO_1$).

End Function Driver

Function old_split($D_1, \ldots, D_M$, $INFO_1$)
  1. $\forall$ Datatype i, i $\in$ $SUBSET_2$
    Read(sequentially) $D_i$.
    Generate part of $INFO_2$.
    /* $INFO_1$ is already available therefore $INFO_2$ can be generated */
  2. $\forall$ Datatype i, i $\in$ $SUBSET_3$
    Read(sequentially) $D_i$.
    Split into $D_{i1}, \ldots, D_{ip}$ using $INFO_2$.
    if (i $\in$ $SUBSET_1$) generate part of $INFO_{1j}$
    $1 \leq j \leq p$ for each of the p splits.
    Modify the one-to-one function for splitting other types.
    Write separately each of p splits.
  3. $\forall$ Datatype i, i $\in$ ALLDATA—$SUBSET_3$
    Read(sequentially) $D_i$.
    Split into $D_{i1}, \ldots, D_{ip}$ using one-to-one function.

if (i ∈ $SUBSET_1$) generate part of $INFO_{1j}$
$1 \leq j \leq p$ foreach of the p splits.
/* All $INFO_{1j}$ will be generated in steps 2 & 3 */
Write separately each of p splits $D_{i1}, \ldots, D_{ip}$
4. ∀ SubData j , $1 \leq j \leq p$, of each of the splits function old_split ($D_{1j}, \ldots, D_{Mj}$, $INFO_{1j}$).
End Function old_split
Comments on SPRINT Method Note that if the nodes of the hierarchical data partitioning tree are processed in breadth-first order, then all the reads required for a particular level of the tree can be combined into a couple of sequential scans of all the data types for that level of the tree.

6.4.3 Modified General Method with Reduced Reads Efficient Method

Root Node Function Driver($D_1, \ldots, D_M$)
1. ∀ Datatype i, i ∈ $SUBSET_1$
   Read(sequentially) $D_i$.
   Generate part of $INFO_1$.
   if (i ∈ $SUBSET_1^2$), generate part of $INFO_1^2$
   Calculate $INFO_1$ for each child node based on partial $INFO_2$ above
2. /* All of $INFO_1$ now available */
   ∀ Datatype i, i ∈ $SUBSET_2^2$ ∪ ($SUBSET_1^2$—$SUBSET_1$)
   Read(sequentially) $D_i$.
   Generate part of $INFO_2$.
   Calculate $INFO_1$ for each child node based on partial $INFO_2$ above
3. /* All of $INFO_2$ now available */
   function efficient_split ($D_1, \ldots, D_M$, $INFO_2$).
End Function Driver Function efficient_split($D_1, \ldots, D_M$, $INFO_2$)
1. ∨ Datatype i, i ∈ $SUBSET_3$
   Read(sequentially) $D_i$.
   Split into $D_{i1}, \ldots, D_{ip}$ using $INFO_2$.
   ∀ $D_{ij}$ $1 \leq j \leq p$, calculate part of $INFO_2$ (if i ∈ $SUBSET_2$)
   Calculate $INFO_1$ for each possible grandchild based on $INFO_2$ above
   Modify the one-to-one function for splitting other types.
   Write separately each of p splits.
2. ∀ Datatype i not ∈ $SUBSET_3$
   Read(sequentially) $D_i$.
   Split into $D_{i1}, \ldots, D_{ip}$ using one-to-one function.
   ∀ $D_{ij}$ $1 \leq j \leq p$, calculate part of $INFO_2$ (if i ∈ $SUBSET_2$)
   Calculate $INFO_1$ for each possible grandchild based on $INFO_2$ above
   Write separately each of p splits $D_{i1}, \ldots, D_{ip}$
3. ∀ SubData j , $1 \leq j \leq p$, of each of the splits function efficient_split($D_{1j}, \ldots, D_{Mj}$, $INFO_{2j}$).
End Function efficient_split
Comments Note that the writes for the data chunks of the child nodes is pipelined with the reads of the data chunks of the parent node. In SPRINT, the writes of the child nodes are at different locations and the trees are binary. In that case, using separate disks for the read of the parent node, the write of the left child node, and the write of the right child node will eliminate most of the write cost.

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

An apparatus for making, using, or selling the invention may be one or more processing systems including, but not limited to, a central processing unit (CPU), memory, storage devices, communication links, communication devices, servers, I/O devices, or any sub-components or individual parts of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system or computer sub-component embodying the invention and to create a computer system or computer sub-component for carrying out the method of the invention. While several preferred embodiments of the invention have been described, it should be apparent that modifications and adaptations to those embodiments may occur to persons skilled in the art without departing from the scope and the spirit of the present invention as set forth in the following claims.

We claim:

1. A computerized method for generating a decision-tree classifier from a training set of records, each record having: (i) at least one attribute, each attribute having an attribute value, (ii) a class label of the class to which the record belongs, and (iii) a record ID, and wherein a decision tree includes a root node, a plurality of interior nodes, and a plurality of leaf nodes, all of the records initially belonging to the root node, the method comprising the steps of:
   generating an attribute list for each attribute of the records, each entry in the attribute list having the attribute value, the class label, and the record ID of the record from which the attribute value is obtained;
   sorting attribute lists for numeric attributes based on attribute values; and
   creating the decision tree by repeatedly reading and partitioning the records at each node using the attribute lists until each leaf node of the decision tree contains records from only one class; wherein said partitioning step requires only a single read for each non-root node.

2. The method of claim 1, wherein said partitioning step comprises the steps of:
   determining a split test for separating the records at an examined node by record classes, using the attribute lists; and
   splitting the records of the examined node according to the split test at the examined node to create child nodes of the examined node, the child nodes becoming new leaf nodes; wherein said determining step and said splitting step are performed in a single read for each non-root node.

3. The method as recited in claim 1, further comprising the step of writing the attribute lists to a memory once every n levels of the decision tree where n≧2, in response to said step of partitioning.

4. The method as recited in claim 1, wherein the attributes include categorical attributes.

5. The method as recited in claim 4, wherein the step of partitioning the records includes the steps of:
partitioning the attribute list for an attribute B used in the split test into new attribute lists corresponding, respectively, to the child nodes of the examined node, including the steps of:
   a) determining if the attribute B is a categorical attribute or a continuous attribute;
   b) if the attribute B is a categorical attribute:
      i) computing a class histogram for each child node corresponding to the categorical attribute;
      ii) after said partitioning step, determining a split test for each child node corresponding to the categorical attribute;
   c) if the attribute B is a continuous attribute, computing a class histogram and determining a split test for each child node corresponding to the categorical attribute;
said step of partitioning the attribute list for an attribute B used in the split test into new attribute lists includes the step of building a a hash table with the record IDs from the entries of the attribute list for B, as the entries are partitioned among the new attribute lists;
partitioning remaining attribute lists of the examined node among the newly created child nodes according to the hash table;
after all attribute lists are partitioned, determining a split test for each child node using said all attribute lists; and
in response to determining the split test for each child node, retaining class histograms for grandchild nodes until the child nodes are processed at a next lower level in the decision tree.

6. The method as recited in claim 5, wherein said step of partitioning remaining attribute lists comprises said steps a) through c).

7. The method as recited in claim 3, wherein the step of determining a split test is based on a splitting index corresponding to a predetermined criterion.

8. The method as recited in claim 7, wherein the splitting index includes a gini index based on relative frequencies of records from each record class present in the training set.

9. The method as recited in claim 6, wherein:
each leaf node includes, for each attribute of the records at the leaf node, a plurality of histograms representing the class distribution of the records at the leaf node; and the leaf node's children nodes; and
the step of determining a split test includes the steps of:
   a) for each attribute A, traversing the attribute list for A at the examined node;
   b) for each value v of A in the attribute list for A:
      i) updating the class histograms for A, at the examined node, with the class label corresponding to v and the value v; and
      ii) if the attribute A is numeric, then computing the splitting index corresponding to splitting criterion (A≦v) for the examined node; and
   c) if the attribute A is categorical, then determining a subset of the attribute A that results in the highest splitting index for the examined node.

10. The method as recited in claim 9, wherein the histograms for each numeric attribute include a $C_{below}$ histogram and a $C_{above}$ histogram, the $C_{below}$ histogram corresponding to the class distribution of the entries in the attribute list for A that precede the value v, and the $C_{above}$ histogram corresponding to the class distribution of the entries in the attribute list for A that include the value v and those following the value v.

11. The method as recited in claim 9, wherein the step of determining a subset of the attribute A includes the steps of:
if a number of elements in a set S of all values of A is less than a predetermined threshold, then evaluating all subsets of the set S to find one with the highest splitting index; and
if the number of elements in S is equal to or more than the predetermined threshold, then:
   a) adding an element of S to an initially empty subset S' of S such that the splitting index for the splitting criterion at the examined node is maximized; and
   b) repeating the step of adding until there is no improvement in the splitting index.

12. The method of claim 1, further comprising the step of pruning the decision tree to obtain a more compact decision tree classifier.

13. A computer system for generating a hierarchical partition-tree from a data set of M data types, each data type having an equal number of elements, and a plurality of one-to-one mapping functions for mapping elements of data type i to data type j ∀ i, j; each element of said each data type having an attribute value, wherein the tree includes a root node, a plurality of interior nodes, and a plurality of leaf nodes, all of the elements initially belonging to the root node, the system comprising:
root node means for generating a first information by sequentially reading a first subset from a set of subsets of the data types, for all data types i, i∈ is subset1, wherein said subset1 is the first subset of the data types;
means for generating a second information by sequentially reading a second subset from a set of subsets of the data types, wherein at least part of the second subset includes subset$^2{}_2$ whose sequential reading is dependent on the first information, said means for generating coupled to said root node means; and
efficient split means for creating the partition-tree by repeatedly reading and partitioning the elements at each node using the second information until each leaf node of the partition-tree contains elements according to a predetermined criterion; wherein only a single read is required for each non-root node, said efficient split means coupled to said means for generating a second information.

14. The system of claim 13, wherein said efficient split means further comprises:
means for partitioning a third subset of the data types based on the second information;
means for partitioning all data types not belonging to the third subset using the one-to-one mapping functions from said all data types not belonging to the third subset to the third subset.

15. The system of claim 14, further comprising:
means for calculating the second information for each child node, coupled to said means for partitioning a third subset and said means for partitioning all data types; and
means for calculating the first information for each possible grandchild node based on the second information associated with the child node, coupled to said means for partitioning a third subset and said means for partitioning all data types.

16. The system as recited in claim 13, wherein said efficient split means further comprises means for writing the data types to a memory once every n levels of the partition-tree where n≧2.

17. The system as recited in claim 13, further comprising:

means for reducing disk seeks, wherein all elements of each node are laid out in a contiguous section including a plurality of internally contiguous subsections wherein each subsection includes all elements associated with a given data type.

18. The system as recited in claim 13, wherein the system comprises a multi-processor system.

19. A computer program product for use with a computer system for directing the system to generate a decision-tree classifier from a training set of records, each record having: (i) at least one attribute, each attribute having an attribute value, (ii) a class label of the class to which the record belongs, and (iii) a record ID, the computer program product comprising:

a computer readable medium;

means, provided on the computer-readable medium, for directing the system to generate an attribute list for each attribute of the records, each entry in the attribute lists having the attribute value, the class label, and the record ID of the record from which the attribute value is obtained;

means, provided on the computer-readable medium, for directing the system to sort attribute lists for numeric attributes based on attribute values; and means, provided on the computer-readable medium, for directing the system to create a decision tree by repeatedly partitioning the records using the attribute lists, the resulting decision tree becoming the decision-tree classifier; wherein said partitioning requires only a single read for each non-root node.

20. A program storage device readable by a machine, tangibly embodying a program of instructions executable by the machine to perform method steps for generating a decision-tree classifier from a training set of records, each record having: (i) at least one attribute, each attribute having an attribute value, (ii) a class label of the class to which the record belongs, and (iii) a record ID, and wherein a decision tree includes a root node, a plurality of interior nodes, and a plurality of leaf nodes, all of the records initially belonging to the root node, said method steps comprising:

generating an attribute list for each attribute of the records, each entry in the attribute list having the attribute value, the class label, and the record ID of the record from which the attribute value is obtained;

sorting attribute lists for numeric attributes based on attribute values; and creating the decision tree by repeatedly reading and partitioning the records at each node using the attribute lists until each leaf node of the decision tree contains records from only one class; wherein said partitioning step requires only a single read for each non-root node.

21. The program storage device of claim 20, said method steps further comprising the step of writing the attribute lists to a memory once every n levels of the decision tree where n≧2, in response to said step of partitioning.

22. The program storage device of claim 20, said method steps further comprising the step of reducing disk seeks, wherein all elements of each node are laid out in a contiguous section including a plurality of internally contiguous subsections wherein each subsection includes all elements associated with a given data type.

* * * * *